United States Patent
Deligny et al.

(10) Patent No.: US 12,173,232 B1
(45) Date of Patent: Dec. 24, 2024

(54) SYNERGETIC SURFACTANT COMBINATION COMPRISING POLYGLYCEROL FATTY ACID ESTER AND SORBITAN ESTER AND/ OR ETHOXYLATED SORBITAN ESTER FOR FRACTURING FLUID

(71) Applicant: OLEON NV, Evergem (BE)

(72) Inventors: Julien Deligny, Venette (FR); Dries Gabriels, Veltem-Beisem (BE); Pieter Struelens, Gooik (BE); Alys Castel, Margny-lès-Compiègne (FR); Cyrielle Huart, Choisy au bac (FR)

(73) Assignee: OLEON NV, Evergem (BE)

( * ) Notice: Subject to any disclaimer, the term of this patent is extended or adjusted under 35 U.S.C. 154(b) by 0 days.

(21) Appl. No.: 18/396,284

(22) Filed: Dec. 26, 2023

(51) Int. Cl.
*C09K 8/62* (2006.01)
*C09K 8/60* (2006.01)
*E21B 43/27* (2006.01)

(52) U.S. Cl.
CPC .............. *C09K 8/62* (2013.01); *C09K 8/602* (2013.01); *E21B 43/27* (2020.05)

(58) Field of Classification Search
CPC ............ C09K 8/62; C09K 8/602; E21B 43/27
See application file for complete search history.

(56) References Cited

U.S. PATENT DOCUMENTS

| | | | |
|---|---|---|---|
| 8,210,263 B2 | 7/2012 | Quintero et al. | |
| 9,296,936 B1 | 3/2016 | Jiang et al. | |
| 9,922,013 B2* | 3/2018 | Le Bescond de Coatpont | G01N 21/6428 |
| 2003/0166472 A1* | 9/2003 | Pursley | C09K 8/82 507/200 |
| 2018/0072935 A1* | 3/2018 | Frederick | C09K 8/602 |
| 2018/0155610 A1* | 6/2018 | Goual | E21B 43/16 |
| 2018/0282610 A1 | 10/2018 | He et al. | |
| 2021/0095184 A1 | 4/2021 | Walker et al. | |
| 2022/0183972 A1* | 6/2022 | Han | A61K 47/14 |
| 2023/0101188 A1 | 3/2023 | Raney et al. | |
| 2023/0108993 A1 | 4/2023 | Raney et al. | |

FOREIGN PATENT DOCUMENTS

WO 2016004215 A1 1/2016

OTHER PUBLICATIONS

Isaac et al., "Surfactants employed in conventional and unconventional reservoirs for enhanced oil recovery—A review," Energy Reports, 2022, vol. 8, pp. 2806-2830.

* cited by examiner

*Primary Examiner* — Silvana C Runyan
(74) *Attorney, Agent, or Firm* — ArentFox Schiff LLP

(57) ABSTRACT

The present disclosure relates to a fracturing fluid comprising a specific surfactant combination, its preparation and to a method for releasing the oil trapped in tight oil reservoirs.

8 Claims, No Drawings

SYNERGETIC SURFACTANT COMBINATION COMPRISING POLYGLYCEROL FATTY ACID ESTER AND SORBITAN ESTER AND/ OR ETHOXYLATED SORBITAN ESTER FOR FRACTURING FLUID

FIELD

The present disclosure relates to a fracturing fluid comprising specific biobased surfactants, its preparation and to a method for releasing the oil trapped in tight oil reservoirs. The fracturing fluid described herein are designed to, among other things, help reduce greenhouse gas emissions.

BACKGROUND

A tight oil reservoir, which may be a tight shale oil reservoir or a tight carbonate reservoir, is an unconventional reservoir that refers to an accumulation of hydrocarbon fluids (oil or gas) that are tightly trapped into the rock porous matrix by important capillary and/or viscous forces.

A fracturing fluid, a type of treatment fluid, is typically a water-based fluid, used to stimulate the extraction of oil. It is injected into a subterranean formation under high pressure through a wellbore to create fractures in the deep-rock formations through which gas and/or oil will flow more freely into the wellbore so that the hydrocarbons may be pumped out of the well, increasing the recovery of oil.

The recovery of oil from a tight oil reservoir mainly depends on the fracturing fluid. The presence of a surfactant in the fracturing fluid can improve the alteration of the wettability and thus the water imbibition into the rock matrix of the reservoir (Improving oil recovery in the Wolfcamp unconventional liquid reservoir using surfactants in completion fluids, Johannes O. Alvarez, David S. Schechter, 2017).

The wettability refers to the preferential adherence and spread of a fluid to a solid surface in the presence of another immiscible fluid.

Water imbibition in the present application refers to the adsorption of water by the rock. The injected water-based fluid will migrate into the rock matrix due to capillary pressure. When water imbibes, oil is expelled out of the rock into the fracture.

Tight oil reservoirs are oil-wet (hydrophobic) character reservoirs, meaning that the oil preferably adheres and spreads on the formation pore surface of the reservoir. In this condition, water alone cannot easily displace the oil.

A suitable surfactant can reverse the wettability, transforming an oil-wet formation to a water-wet (hydrophilic) formation. Thus, water rather than oil adheres preferentially to the formation pore surface of the reservoir. Water can then displace more easily the oil from the reservoir, the oil no longer adhering on the formation pore surface.

By changing the wettability of the formation pore surface of a reservoir, e.g. changing the oil-wet character of the formation pore surface of the reservoir to water-wet, spontaneous imbibition of water occurs, enabling the oil to flow through the fractures to the wellbore, thus increasing the quantity of hydrocarbons that can be extracted.

Different surfactants suitable for this application are described in literature (Surfactants employed in conventional and unconventional reservoirs for enhanced oil recovery-A review, Oguntade Tomiwa Isaac, Hui Pu, Babalola Aisosa Oni, Fadairo Adesina Samson, 2022):

anionic surfactants, such as alkyl sulfonates, sulfosuccinates and sulphates;

non-ionic surfactants, such as linear or branched alkoxylated alcohols and alkoxylated phenols;

cationic surfactants, such as ammonium salts.

The patent application US2021/0095184, hereby incorporated by reference in its entirety, discloses a fluid for treating unconventional reservoirs, said fluid comprising an anionic surfactant package which preferably comprises a sulfonate, a disulfonate, a polysulfonate, a sulfate, a disulfate, a polysulfate, a sulfosuccinate, a disulfosuccinate, a polysulfosuccinate, a carboxylate, a dicarboxylate, a polycarboxylate, or any combination thereof.

The U.S. Pat. No. 10,640,698, hereby incorporated by reference in its entirety, discloses methods for treating subterranean using a treatment fluid comprising an aqueous base fluid and a surfactant comprising an ethoxylated amine or derivative thereof.

The U.S. Pat. No. 11,566,169, hereby incorporated by reference in its entirety, describes a well treatment fluid for treating oil-wet formations, comprising a wettability modifier, which includes an alkylamine oxide surfactant, and an organic compound having a phosphonoalkyl moiety.

However, some surfactants may present environmental, health, and safety concerns.

SUMMARY

Due to the continuous rise in crude oil demand, there is a widespread interest in any method that would improve oil recovery. Also, there is still a need for surfactants, advantageously obtained from renewable resources, that would be effective in oil-wet formations and that would increase the quantity of hydrocarbons that can be extracted from tight oil reservoirs by reversing the wettability from oil-wet to water-wet formations.

The work of the inventors has shown that a particular surfactant combination, obtainable from vegetable oils, exhibits a synergetic effect enabling reverse wettability of tight oil reservoir formations.

In addition to being sustainable, the fracturing fluids described herein enable oil to be released with higher yields. As a result, for a same quantity of oil recovered, less quantity of fracturing fluid is necessary, and therefore energy savings are achieved on at least two levels:

savings in injection energy, since fewer quantity of fracturing fluid to inject into reservoirs is required;

production energy savings, since less waste need to be processed.

Energy efficiency has a number of benefits for the environment. In particular, it reduces greenhouse gas emissions.

Thus, the release of oil from tight oil reservoirs, by using the fracturing fluids described herein, may enable reduction of greenhouse emissions.

The disclosure relates thus to a fracturing fluid comprising:

at least 97 wt % of brine;

0.05-1 wt % of a surfactant combination comprising or consisting of: a polyglycerol fatty acid ester; and a sorbitan ester and/or an ethoxylated sorbitan ester;

wherein the weight ratio (polyglycerol fatty acid ester)/ (sorbitan ester) is comprised between 90/10 and 50/50; weight percentages being based on the weight of the fracturing fluid.

In the present application, unless otherwise indicated, all ranges of values used are to be understood as being inclusive limits.

The brine is a solution of mineral salt(s) in water.

The mineral salt(s) is preferably potassium chloride, calcium chloride, sodium chloride, magnesium chloride, sodium sulfate, sodium bicarbonate, potassium bromide, strontium chloride, sodium fluoride and/or sodium bromide.

Preferably, the quantity of the mineral salt is comprised between 1 and 30 wt % based on the weight of the brine.

Preferably, the quantity of water is comprised between 70 and 99 wt % based on the weight of the brine.

Preferably, the quantity of the brine is of at least 98 wt % based on the weight of the composition.

Preferably, the quantity of the brine is comprised between 97 and 99.95 wt %, such as between 98 and 99.95 wt %, more preferably between 97 and 99.90 wt %, such as between 98 and 99.90 wt % or between 99 and 99.90 wt % based on the weight of the composition.

Advantageously, in the fracturing fluid according to the disclosure, the sorbitan ester and/or the ethoxylated sorbitan ester is selected from the group consisting of sorbitan monooleate, sorbitan monolaurate, ethoxylated derivatives thereof, and mixtures thereof.

Preferably, the sorbitan ester and/or the ethoxylated sorbitan ester is a sorbitan monooleate and/or an ethoxylated sorbitan monooleate.

It is considered in the present patent application, that the terms "consisting of" include in particular residual unreacted chemicals (such as polyglycerol) and impurities of the compounds of the surfactant combination.

The polyglycerol fatty acid ester (PGE) is obtainable by a process comprising an esterification reaction between a polyglycerol and a fatty acid.

A polyglycerol is obtainable by an oligomerization reaction of glycerol. The oligomerization reaction is preferably carried out at a temperature comprised between 18° and 280° C., optionally in the presence of a catalyst, such as sodium hydroxide, potassium hydroxide or lithium hydroxide. The oligomerization reaction is preferably conducted until the refractive index reaches a value comprised between 1.4650 and 1.5000 at 60° C.

In the present application, unless otherwise indicated, refractive indexes are measured according to standard to standard ASTM D1218.

From the hydroxyl value of the polyglycerol, the mean degree of oligomerization, e.g. the average number of glycerol units in the polyglycerol, can be determined theoretically.

Preferably, the mean degree of oligomerization of the polyglycerol is comprised between 4 and 12, more preferably between 4 and 10, even more preferably between 6 and 10.

In other words, the polyglycerol (PG) is preferably a polyglycerol-4 (PG4), a polyglycerol-6 (PG6), a polyglycerol-8 (PG8), a polyglycerol-10 (PG10), a polyglycerol-12 (PG12), the integer following the polyglycerol (PG) represents the average number of glycerol units forming the polyglycerol.

The fatty acid of the polyglycerol fatty acid ester, comprises preferably from 6 to 20, more preferably from 6 to 18 carbon atoms, even more preferably from 8 to 16 carbon atoms such as from 8 to 12 carbon atoms.

Preferably, the fatty acid of the polyglycerol fatty acid ester is linear.

The fatty acid of the polyglycerol fatty acid ester may be saturated or unsaturated, preferably saturated.

In particular, the fatty acid is caprylic acid, capric acid and/or lauric acid.

The esterification reaction of the polyglycerol with the fatty acid to obtain the polyglycerol fatty acid ester, is preferably carried out at a temperature between 15° and 250° C. A catalyst may be used to speed up the reaction, such as paratoluene sulfonic acid, methane sulfonic acid, hydrogen chloride or sulfuric acid. The esterification reaction is preferably conducted until the acid value is of at most 1 mgKOH/g.

The polyglycerol fatty ester has preferably an acid value between 0 and 1 mgKOH/g.

The polyglycerol fatty ester has preferably an hydroxyl value between 150 and 800, more preferably between 200 and 700 mgKOH/g.

In the present application, unless otherwise indicated,
 acid values are measured according to standard AOCS Cd 3D-63;
 hydroxyl values are measured according to method OA-081.

Advantageously, in the fracturing fluid according to the disclosure, the weight ratio (polyglycerol fatty acid ester)/(sorbitan ester and ethoxylated sorbitan ester) is comprised between 80/20 and 50/50.

Advantageously, in the fracturing fluid according to the disclosure, the sorbitan ester and/or the ethoxylated sorbitan ester of the surfactant combination, is an ethoxylated sorbitan monooleate.

A preferred surfactant combination comprises or consists of:
 50-80 wt % of a polyglycerol fatty acid ester; and
 20-50% of an ethoxylated sorbitan monooleate;
weight percentages being based on the weight of the surfactant combination.

Advantageously, in the fracturing fluid according to the disclosure, the quantity of the surfactant combination is comprised between 0.1 and 1 wt %.

Preferably, the quantity of the surfactant combination is comprised between 0.1 and 0.5 wt % based on the weight of the fracturing fluid.

The fracturing fluid may further comprise a proppant, a viscosifying agent, a gelling agent, a friction reducer, a clay control agent, a biocide, a corrosion inhibitor, an iron control agent, a crosslinker, a breaker, a pH control agent, a scale inhibitor and/or an oxygen scavenger.

Those additives are preferably chosen among additives usually used in oilfield.

Preferably, the total quantity of the additives present in the fracturing fluid is comprised between 0.01 and 2 wt % based on the weight of the composition.

A preferred fracturing fluid comprises:
 97-99.90 wt % of brine;
 0.1-1 wt % of a surfactant combination comprising or consisting of:
  50-80 wt % of a polyglycerol fatty acid ester; and
  20-50 wt % of an ethoxylated sorbitan monooleate;
 weight percentages being based on the weight of the surfactant combination;
  0.01-2 wt % of a proppant, a viscosifying agent, a gelling agent, a friction reducer, a clay control agent, a biocide, a corrosion inhibitor, an iron control agent, a crosslinker, a breaker, a pH control agent, a scale inhibitor and/or an oxygen scavenger;
weight percentages being based on the weight of the fracturing fluid.

In the surfactant combination of the fracturing fluid according to the disclosure, the weight ratio (polyglycerol fatty acid ester)/(sorbitan ester and the ethoxylated sorbitan ester) is preferably comprised between 70/30 and 50/50.

Advantageously, in the fracturing fluid according to the disclosure, the polyglycerol fatty acid ester of the surfactant combination, is a polyglycerol-10 fatty acid ester.

The specific combination, polyglycerol-10 fatty ester and ethoxylated sorbitan monooleate, exhibits a particularly good ability to alter wettability of shale rocks, as shown in Example 2 (F4-F6), with very low contact angles, lower than 35°.

A particularly preferred surfactant combination comprises or consists of:
- 50-70 wt % of a polyglycerol-10 fatty acid ester;
- 30-50 wt % of ethoxylated sorbitan monooleate;
- weight percentages being based on the weight of the surfactant combination.

The polyglycerol-10 fatty acid ester is preferably a polyglycerol-10 caprylate, a polyglycerol-10 caprate and/or a polyglycerol-10 laurate.

A particularly preferred fracturing fluid comprises:
- 97-99.90 wt % of brine;
- 0.1-1 wt % of a surfactant combination comprising or consisting of:
  - 50-70 wt % of a polyglycerol-10 fatty acid ester; and
  - 30-50 wt % of an ethoxylated sorbitan monooleate;
  weight percentages being based on the weight of the surfactant combination;
- 0.01-2 wt % of a proppant, a viscosifying agent, a gelling agent, a friction reducer, a clay control agent, a biocide, a corrosion inhibitor, an iron control agent, a cross-linker, a breaker, a pH control agent, a scale inhibitor and/or an oxygen scavenger;
weight percentages being based on the weight of the fracturing fluid.

The disclosure also relates to a process for preparing the fracturing fluid according to the disclosure, comprising a step of adding a polyglycerol fatty acid ester and a sorbitan ester, to a brine; wherein the weight ratio (polyglycerol fatty acid ester)/(sorbitan ester and the ethoxylated sorbitan ester) is comprised between 90/10 and 50/50.

Preferably, the addition is performed under mixing.

As shown in Example 2, the fracturing fluid according to the disclosure is suitable to reverses the wettability of at least a portion of the formation of an unconventional reservoir from oil-wet to water-wet, thus improving the recovery of oil from those specific reservoirs.

The disclosure also concerns a method for releasing the oil from a tight oil reservoir comprising injecting any of the fracturing fluids described herein, through a wellbore into the said tight oil reservoir.

The fracturing fluid, the brine, the surfactant combination, the polyglycerol fatty acid ester, the sorbitan ester and the ethoxylated sorbitan ester are as described above, including preferential features and embodiments.

ASPECTS

The disclosure provides the following, specific aspects.

Aspect 1. A fracturing fluid comprising:
- at least 97 wt % of brine;
- 0.05-1 wt % of a surfactant combination comprising or consisting of:
  - a polyglycerol fatty acid ester; and
  - a sorbitan ester and/or an ethoxylated sorbitan ester;
  - wherein the weight ratio (polyglycerol fatty acid ester)/(sorbitan ester) is comprised between 90/10 and 50/50;
weight percentages being based on the weight of the fracturing fluid.

Aspect 2. The fracturing fluid according to aspect 1, wherein the sorbitan ester and/or the ethoxylated sorbitan ester is selected from the group consisting of sorbitan monooleate, sorbitan monolaurate, ethoxylated derivatives thereof, and mixtures thereof.

Aspect 3. The fracturing fluid according to aspect 1 or 2, wherein the weight ratio (polyglycerol fatty acid ester)/(sorbitan ester and ethoxylated sorbitan ester) is comprised between 80/20 and 50/50.

Aspect 4. The fracturing fluid according to any of aspects 1 to 3, wherein the sorbitan ester and/or the ethoxylated sorbitan ester of the surfactant combination, is an ethoxylated sorbitan monooleate.

Aspect 5. The fracturing fluid according to any of aspects 1 to 4, wherein the quantity of the surfactant combination is comprised between 0.1 and 1 wt %.

Aspect 6. The fracturing fluid according to any of aspects 1 to 5, wherein the polyglycerol fatty acid ester of the surfactant combination, is a polyglycerol-10 fatty acid ester.

Aspect 7. A process for preparing the fracturing fluid according to any of aspects 1 to 6, comprising a step of adding a polyglycerol fatty acid ester and a sorbitan ester, to a brine; wherein the weight ratio (polyglycerol fatty acid ester)/(sorbitan ester and the ethoxylated sorbitan ester) is comprised between 90/10 and 50/50.

Aspect 8. A method for releasing the oil from a tight oil reservoir comprising injecting the fracturing fluid according to any of aspects 1 to 6, through a wellbore into the said tight oil reservoir.

EXAMPLES

The disclosure is further described in the following examples. It will be appreciated that the disclosure as claimed is not intended to be limited in any way by these examples.

Example 1: Preparation of Fracturing Fluids

Preparation of Polyglycerol Fatty Acid Esters
a) Oligomerization Reaction of Glycerol to Form Polyglycerol-6 (PG6)

99.9 wt % of glycerol and 0.1 wt % of sodium hydroxide solution at 10% (catalyst) were loaded into a reactor equipped with a distillation unit to remove the water produced during the reaction. The mixture was heated up at 260° C. under stirring at 500 RPM under nitrogen bubbling. The polymerization of glycerol was controlled by refractive index. Once the refractive index at 60° C. reached 1.4869 value, the reaction was stopped. The reactor was then put under reduced pressure to remove the lighter fractions, e.g. water, glycerol and diglycerol. Once the distillation completed, the reactor was set back to atmospheric pressure and cooled down.

b) Oligomerization Reaction of Glycerol to Form Polyglycerol-10 (PG10)

PG10 was prepared according to the method described in Example 1.1a), except that the reaction was stopped when the refractive index at 60° C. reached 1.4915 at 60° C.

c) Esterification Reaction Between a Polyglycerol and a Fatty Acid to Form a Polyglycerol Fatty Acid Ester A polyglycerol prepared in Example 1.1a) or b) and a fatty acid (1:1 molar ratio) were loaded into a reactor equipped with a distillation unit to remove the water produced during the reaction.

The fatty acid is caprylic acid (C8), capric acid (C10) or lauric acid (C12).

The esterification was carried out at 210° C. under stirring at 400 RPM and nitrogen bubbling. The esterification was stopped when the acid value was below 1 mgKOH/g. The reactor was then cooled down.

Characteristics of polyglycerol fatty acid esters obtained are described in Table 1.

TABLE 1

Characteristics of polyglycerol fatty acid esters

|  | Acid value (mgKOH/g) | Hydroxyl value (mgKOH/g) |
| --- | --- | --- |
| PG6-C10 | 0.8 | 550 |
| PG6-C12 | 0.9 | 493 |
| PG10-C8 | 0.5 | 530 |
| PG10-C10 | 0.5 | 410 |
| PG10-C12 | 0.7 | 361 |

2. Preparation of Fracturing Fluids According to the Disclosure

Each fracturing fluid (F) according to the disclosure was prepared by mixing together a polyglycerol fatty acid ester prepared in Example 1.1c), with ethoxylated (20 EO) sorbitan monooleate (Radiasurf 7157 from Oleon) in a brine comprising 5 wt % potassium chloride (KCl) in deionized water.

Chemicals and quantities for each fracturing fluid are specified in Table 2.

TABLE 2

Content of fracturing fluids according to the disclosure

|  | F 1 (wt %) | F 2 (wt %) | F 3 (wt %) | F 4 (wt %) | F 5 (wt %) | F 6 (wt %) |
| --- | --- | --- | --- | --- | --- | --- |
| PG6-C10 | 0.07 |  |  |  |  |  |
| PG6-C12 |  | 0.07 | 0.05 |  |  |  |
| PG10-C8 |  |  |  | 0.07 |  |  |
| PG10-C10 |  |  |  |  | 0.07 |  |
| PG10-C12 |  |  |  |  |  | 0.07 |
| Ethoxylated (20 EO) sorbitan monooleate | 0.03 | 0.03 | 0.05 | 0.03 | 0.03 | 0.03 |
| KCl brine (5 wt %) | 99.90 | 99.90 | 99.90 | 99.90 | 99.90 | 99.90 |

3. Preparation of Comparative Fracturing Fluids

Comparative fracturing fluids CF1-CF8 were prepared by mixing chemicals according to quantities described in Table 3.

In particular, CF1-CF6 were prepared by mixing together a polyglycerol fatty acid ester prepared in Example 1.1c), with brine comprising 5 wt % potassium chloride (KCl) in deionized water.

Comparative fracturing fluid CF7 was prepared by mixing Triton X100, polyethyleneglycol-[4-(1, 1,3,3-tetramethyl-butyl)phenyl]-ether (CAS Number: 9036-19-5), with brine comprising 5 wt % potassium chloride (KCl) in deionized water.

Triton X100 is a surfactant usually use for fracturing fluids.

Comparative fracturing fluid CF8 was prepared by mixing Triton X100 and ethoxylated (20 EO) sorbitan monooleate in a brine comprising 5 wt % potassium chloride (KCl) in deionized water.

TABLE 3

Content of comparative fracturing fluids

|  | CF1 (wt %) | CF2 (wt %) | CF3 (wt %) | CF4 (wt %) | CF5 (wt %) | CF6 (wt %) | CF7 (wt %) | CF8 (wt %) |
| --- | --- | --- | --- | --- | --- | --- | --- | --- |
| PG6-C10 |  | 0.10 |  |  |  |  |  |  |
| PG6-C12 |  |  | 0.10 |  |  |  |  |  |
| PG10-C8 |  |  |  | 0.10 |  |  |  |  |
| PG10-C10 |  |  |  |  | 0.10 |  |  |  |
| PG10-C12 |  |  |  |  |  | 0.10 |  |  |
| Triton X100 |  |  |  |  |  |  | 0.10 | 0.07 |
| Ethoxylated (20 EO) sorbitan monooleate | 0.10 |  |  |  |  |  |  | 0.03 |
| KCl brine (5 wt %) | 99.90 | 99.90 | 99.90 | 99.90 | 99.90 | 99.90 | 99.90 | 99.90 |

Example 2: Evaluation of the Wettability Alteration Property of Fracturing Fluids The wettability alteration property is usually evaluated through contact angle measurements on rock surfaces.

In the present case, the reverse of the wettability from oil-wet shale rock to water-wet shale rock was evaluated by measuring the contact angles formed by a drop of oil on the surface of rocks immerged in different fracturing fluids.

In presence of an oil-wet surface, the drop of oil spreads over the surface of the rock, maximizing the contact with the solid surface, since the affinity between the drop of oil and the rock is high.

In presence of water-wet surface, the drop of oil beads up over the surface of the rock, minimizing the contact with the solid surface, since the affinity between the drop of oil and the rock is low.

Generally, a solid surface is considered water-wet if the contact angle is lower than 75°.

To mimic the reservoir conditions, and have a "oil-wet" rock, clean shale rocks were first aged in an oil (a light sweet naphthenic crude oil) for 10 days at 80° C. under 10 bars.

A clean rock is a rock soaked into a mixture of xylene/acetone followed by solvent evaporation at room temperature. This operation is repeated until the xylene/acetone solution is uncolored.

The oil-wet shale rocks, also named aged shale rocks, thus obtained were each immerged in a fracturing fluid in a sealed container for 3 days at 80° C.

Then, shale rocks were placed each in turn on support in a glass cell, filled with the fracturing fluid at room temperature.

The oil (light sweet naphthenic crude oil) was injected in the media with a syringe equipped with a J shape needle to drop it under the shale rock.

The efficiency of the fracturing fluid to reverse the wettability was evaluated by measuring the contact angle between the shale rock surface and the drop of oil.

The contact angle measurement was made with the DSA 100 Drop Shape Analyzer from Krüss, using the captive drop method.

A blank was also performed with an aged shale rock immerged in only KCl brine (5 wt %) for 3 days at 80° C.

Each evaluation has been repeated four times per tested fluid. The average of the four measurements and the standard deviation are gathered in Table 4.

TABLE 4

Contact angles formed between an oil drop and the surface of a shale rock

| | | Average contact angle value | Standard deviation |
|---|---|---|---|
| Blank | KCl brine (5 wt % KCl in water) | 130.30° | 15.88° |
| CF1 | Ethoxylated (20 EO) sorbitan monooleate (0.1 wt % in KCl brine (5 wt %)) | 58.03° | 24.62° |
| CF2 | PG6-C10 (0.1 wt % in KCl brine (5 wt %)) | 120.75° | 19.36° |
| F1 | PG6-C10/Ethoxylated (20 EO) sorbitan monooleate (70/30) (0.1 wt % in KCl brine (5 wt %)) | 40.53° | 2.36° |
| CF3 | PG6-C12 (0.1 wt % in KCl brine (5 wt %)) | 135.00° | 11.93° |
| F2 | PG6-C12/Ethoxylated (20 EO) sorbitan monooleate (70/30) (0.1 wt % in KCl brine (5 wt %)) | 50.43° | 3.14° |
| F3 | PG6-C12/Ethoxylated (20 EO) sorbitan monooleate (50/50) (0.1 wt % in KCl brine (5 wt %)) | 43.70° | 7.52° |
| CF4 | PG10-C8 (0.1 wt % in KCl brine (5 wt %)) | 45.93° | 3.90° |
| F4 | PG10-C8/Ethoxylated (20 EO) sorbitan monooleate (70/30) (0.1 wt % in KCl brine (5 wt %)) | 33.30° | 2.83° |
| CF5 | PG10-C10 (0.1 wt % in KCl brine (5 wt %)) | 44.45° | 0.31° |
| F5 | PG10-C10/ Ethoxylated (20 EO) sorbitan monooleate (70/30) (0.1 wt % in KCl brine (5 wt %)) | 32.58° | 1.02° |
| CF6 | PG10-C12 (0.1 wt % in KCl brine (5 wt %)) | 37.00° | 5.91° |
| F6 | PG10-C12/ Ethoxylated (20 EO) sorbitan monooleate (70/30) (0.1 wt % in KCl brine (5 wt %)) | 33.83° | 2.76° |
| CF7 | Triton X100 (0.1 wt % in KCl brine (5 wt %)) | 55.70° | 1.71° |
| CF8 | Triton X100/Ethoxylated (20 EO) sorbitan monooleate (70/30) (0.1 wt % in KCl brine (5 wt %)) | 147.35° | 4.66° |

It can be observed that without any surfactant in the brine (Blank) the contact angle is high (130.3°), meaning that the drop of oil spreads well over the surface of the shale rock, meaning that the shale rock is stil oil-wet. The immersion of a shale rock in a KCl brine does not change its wettability.

The synergetic effect between polyglycerol fatty acid esters and ethoxylated (20 EO) sorbitan monooleate is clearly illustrated by the contact angles measured. Indeed, the resulting contact angles measured in cases the shale rocks were immersed in a fracturing fluid according to the disclosure (F1-F7) are always lower than the contact angles measured in cases the shale rocks were immersed in a comparative fracturing comprising a single surfactant, a polyglycerol fatty acid ester or ethoxylated (20 EO) sorbitan monooleate (CF2-CF6).

Moreover, the contact angles measured when shale rock was immersed in a fracturing fluid according to the disclosure (F1-F7) were all lower than 55°, and even lower than 45°, which demonstrates a particularly good ability to reverse the wettability of shale rocks from oil-wet to water-wet. The lowest contact angles were obtained with polyglycerol-10 fatty acid ester and ethoxylated sorbitan monooleate couples (F4-F6), which were all lower than 35°.

No synergetic effect was observed between Tritonx100 and ethoxylated (20 EO) sorbitan monooleate (CF8), since the contact angle value obtained was even higher than contact angle values measured with fracturing fluids comprising Triton X100 alone (CF7) and ethoxylated (20 EO) sorbitan monooleate alone (CF1).

The invention claimed is:

1. A fracturing fluid comprising:
   97 to 99.95 wt % of brine;
   0.05-1 wt % of a surfactant combination comprising or consisting of:
   a polyglycerol fatty acid ester; and
   a sorbitan ester and/or an ethoxylated sorbitan ester;
   wherein the weight ratio polyglycerol fatty acid ester/ sorbitan ester and/or ethoxylated sorbitan ester is comprised between 90/10 and 50/50;
   weight percentages being based on the weight of the fracturing fluid.

2. The fracturing fluid according to claim 1, wherein the ethoxylated sorbitan ester is selected from the group consisting of ethoxylated sorbitan monooleate, ethoxylated sorbitan monolaurate, and mixtures thereof.

3. The fracturing fluid according to claim 1, wherein the weight ratio (polyglycerol fatty acid ester)/(ethoxylated sorbitan ester) is comprised between 80/20 and 50/50.

4. The fracturing fluid according to claim 1, wherein the ethoxylated sorbitan ester of the surfactant combination is an ethoxylated sorbitan monooleate.

5. The fracturing fluid according to claim 1, wherein the weight percentage of the surfactant combination is between 0.1 and 1 wt %.

6. The fracturing fluid according to claim 1, wherein the polyglycerol fatty acid ester of the surfactant combination is a polyglycerol-10 fatty acid ester.

7. A process for preparing the fracturing fluid according to claim 1, comprising a step of adding a polyglycerol fatty acid ester and an ethoxylated sorbitan ester, to a brine; wherein the weight ratio (polyglycerol fatty acid ester)/ (ethoxylated sorbitan ester) is comprised between 90/10 and 50/50.

8. A method for releasing the oil from a tight oil reservoir comprising injecting the fracturing fluid according to claim 1, through a wellbore into the said tight oil reservoir.

* * * * *